United States Patent
d'Auria et al.

[11] 3,953,727
[45] Apr. 27, 1976

[54] SYSTEM FOR TRANSMITTING INDEPENDENT COMMUNICATION CHANNELS THROUGH A LIGHT-WAVE MEDIUM

[75] Inventors: Luigi d'Auria; Claude Puech; Jean-Claude Reymond, all of Paris, France

[73] Assignee: Thomson-CSF, Paris, France

[22] Filed: Jan. 17, 1975

[21] Appl. No.: 542,022

[30] Foreign Application Priority Data
Jan. 18, 1974  France ................. 74.01800

[52] U.S. Cl. ................................. 250/199
[51] Int. Cl.² ............................. H04B 9/00
[58] Field of Search ................. 250/199

[56] References Cited
UNITED STATES PATENTS

| | | | |
|---|---|---|---|
| 3,297,875 | 1/1967 | Garwin et al. | 250/199 |
| 3,449,577 | 6/1969 | Kogelnik | 250/199 |
| 3,566,127 | 2/1971 | Hafner | 250/199 |
| 3,590,248 | 6/1971 | Chatterton | 250/199 |
| 3,670,166 | 6/1972 | Kaminow | 250/199 |
| 3,838,278 | 9/1974 | Duguay | 250/199 |
| 3,845,293 | 10/1974 | Borner | 250/199 |
| 3,845,294 | 10/1974 | Indig | 250/199 |

Primary Examiner—Albert J. Mayer
Attorney, Agent, or Firm—Cushman, Darby & Cushman

[57] ABSTRACT

A system for creating independent communication channels using a single optical fibre, is provided. To this end, at the transmitting end, several "laser" diodes such as that $E_{11}$ (FIG. 1) supply infrared rays of a wavelength defined to within at least 50 angstrom units (in the case of suitably doped gallium arsenide diodes), to selective mirrors such as that $M_{11}$ which are quasi-transparent vis-a-vis other wave lengths. These rays focussed along with those coming from other diodes, upon the entry face 11 of the fibre. At the receiving end, there is an arrangement similar to that at the transmitting end, but comprising, instead of the diodes, photodetectors. A diode and a photodetector may be exchanged in order to provide a channel operating in the reverse direction.

9 Claims, 6 Drawing Figures

SYSTEM FOR TRANSMITTING INDEPENDENT COMMUNICATION CHANNELS THROUGH A LIGHT-WAVE MEDIUM

The present invention relates to a system for transmitting independent communication channels through a light-wave medium e.g. an optical fiber, and to the devices used to operate said system. It relates to systems employing "go — no go" modulation of a coherent or incoherent light wave. This kind of modulation utilises, for example, "laser" diodes i.e. electroluminescent diodes which emit within a narrow band of wavelengths, and it is possible to choose the wavelength as a function of the conditions of manufacture of the diode, for example by doping the semi-conductor material.

Those skilled in the art will be aware that the maximum data rate which can be carried by an optical fibre of given length, for a given communication error raten is limited by two main factors which are contradictory in nature:

— the apertural angle of the light beam which the fibre is effectively capable of propagating; this depends solely upon the refractive indices of the glass used to manufacture the fibre; the rate is the higher the smaller said angle is; for example, for a given fibre 1 kilometer long, an apertural half-angle in air, of 36°, must not be exceed if a rate of 10 megabits per second is to be achieved;

— the light power available at the fibre output; this must be in excess of a threshold below which the communication error rate is in excess of the fixed limit. For example, for a permissible error rate of $10^{-8}$, the output detector must receive a minimum power of 1 microwatt peak, which requires that at the fibre input a power of 10 milliwatts is necessary if the fibre attenuation is 40 decibels.

The relationship:

$$P = K \sin^2 u \qquad 1.$$

where $k$ is a constant characteristic of the light source, applies between the power $P$ injected at the fibre input and the apertural angle $u$.

Thus, there is a limit on the power for a given rate, since the value of the rate fixes a maximum value of $u$; similarly, there is a limit on rate for a given communication error rate.

In accordance with the invention, there is provided a system for multiplexing an optic communication comprising at least one optical fibre, a multiplicity of electroluminescent diodes producing light radiation of different wavelengths, and a multiplicity of photodetectors, means for selecting said wavelengths, modulating means applied to said diodes, and demodulating means applied to said photodetectors.

The invention will be better understood and other of its features rendered apparent, from a consideration of the ensuing description and the accompanying drawings in which.

Figure 1:
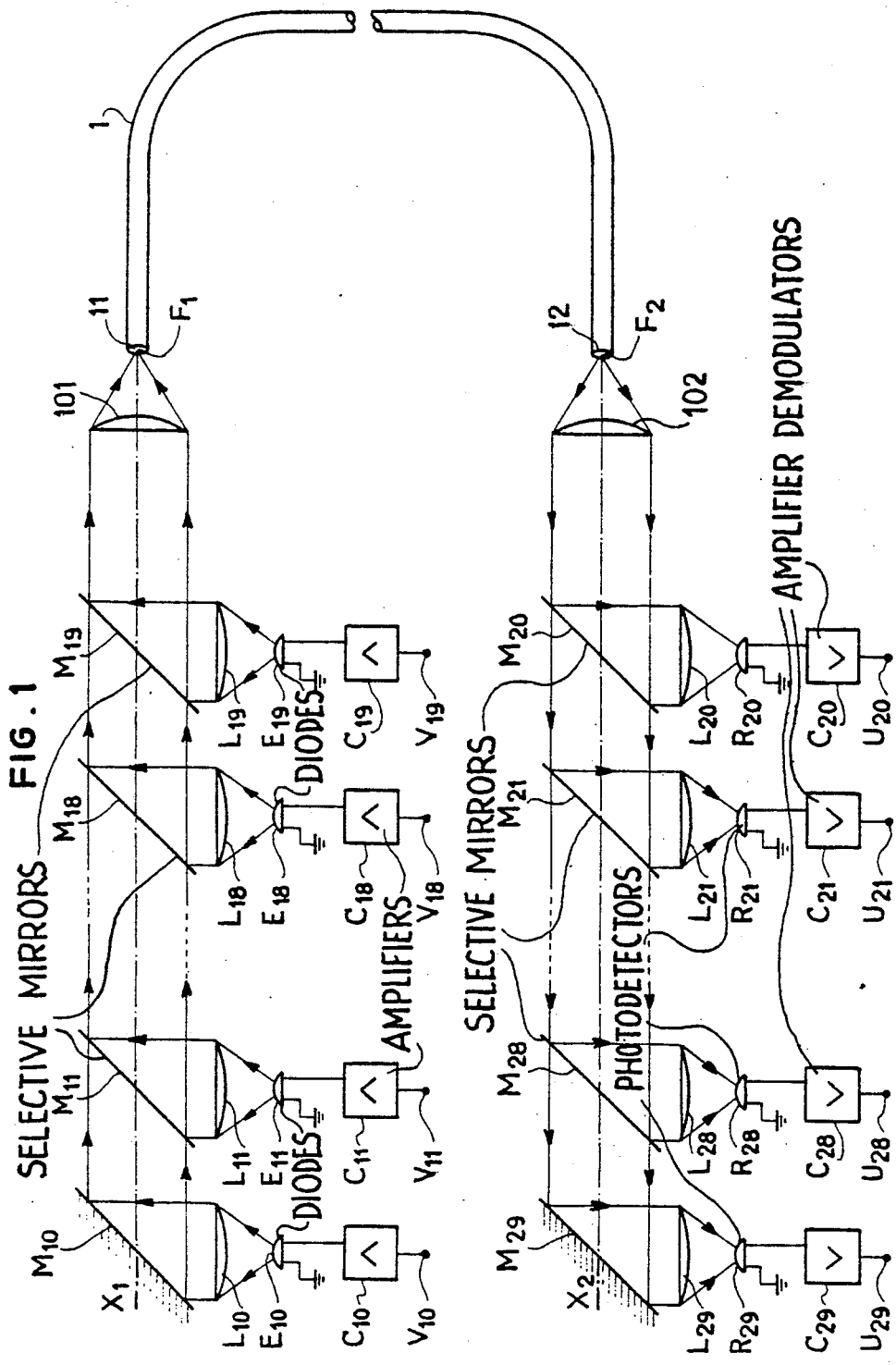
FIG. 1 illustrates an example of the invention.

FIG. 1 illustrates a device with 10 communication channels (unidirectional) operating on the principle of the system in accordance with the invention. A fibre 1, for example 1 kilometer long, has an input face 11 at the "transmitting" end, and an output face 12 at the "receiving" end. At the "transmitting" end, 10 electroluminescent diodes $E_{10}$, $E_{11}$, ... $E_{18}$, $E_{19}$ are arranged in a parallel array. The two first and two last of these diodes, are the only ones to have been illustrated. For example aluminum-doped gallium arsenide diodes, of the double heterostructure type, whose different doping levels are such that 10 different emission spectral "lines" in the near-infrared, are obtained, will be used.

Figure 2:
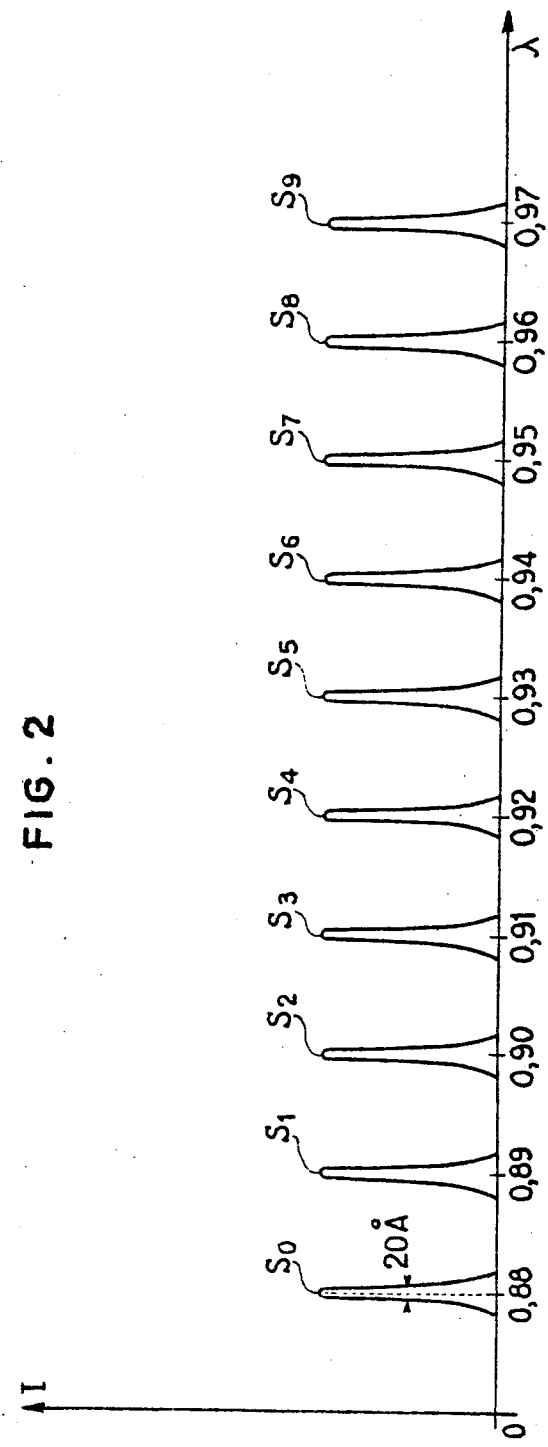
FIG. 2 is an explanatory diagram.

These spectra have been shown on a graph in FIG. 2, the graph plotting the luminous intensity I as a function of the wavelength $\lambda$ in microns. There can be seen 10 "lines" $S_0$, $S_1$, ... $S_9$, substantially all having the same highly elongated bell form, with a base measuring less than 50 angstrom units, the mid-height width being of the order of 20 angstroms units, and the axes of the lines being regularly spaced from 0.88 to 0.97 micron, in other words at 100 angstrom unit-intervals.

However, it is currently possible to manufacture band-pass and band-cut filters which are sufficiently selective in order to readily separate such spectral lines. These filters are designed in the form of assemblies of transparent plates of given thicknesses (of the order of half the wavelength).

Equally, it is known to manufacture selective mirrors which will reflect the radiation within a narrow frequency band (corresponding to the width of a line in FIG. 2), and which behave as transparent plates vis-a-vis other wavelengths.

Selective mirrors, orientated at 45° in relation to the axis $F_1X_1$ of the entry face 11, centered at $F_1$, are arranged in a parallel fashion. The mirrors $M_{11}$ to $M_{19}$ selectively reflect the lines $S_1$ to $S_9$ of FIG. 2. These mirrors are preceded by a non-selective mirror $M_{10}$. Similarly, the mirrors $M_{20}$ to $M_{28}$, orientated at 45° in relation to the exit axis $F_2X_2$ of the fibre, selectively reflect the lines $S_0$ to $S_8$ and the terminal mirror $M_{29}$ is a non-selective mirror. The terminal mirrors $M_{10}$ and $M_{29}$ could either be replaced by selective mirrors, which would mean an unnecessary extra expenditure, or be discarded provided that the light transmitter and receptor corresponding to the relevant channels, were suitably positioned.

In the device shown in FIG. 1 the diodes $E_{10}$ to $E_{19}$ are respectively supplied with voltage pulses by the input circuits $C_{10}$ to $C_{19}$ responsible for amplifying the power of the pulses for transmission, the pulses being received at the channel inputs $V_{10}$ to $V_{19}$, and for modulating the diodes $E_{10}$ to $E_{19}$. Circuits of this kind, well known to those skilled in the art, have been symbolically illustrated.

The diodes $E_{10}$ to $E_{19}$ are respectively arranged at the foci of lenses $L_{10}$ to $L_{19}$ whose axes are perpendicular to the axis $F_1X_1$. The mirrors $M_{10}$ to $M_{19}$ are orientated in such a manner as to direct the reflected rays in the direction $F_1X_1$. These rays are focussed at $F_1$ by a lens 101.

At the receiving end, similarly there is to be found a lens 102 whose axis is coincidental with the axis $F_2X_2$ of the face 12 of the fibre 1, and which has a focal point $F_2$ arranged at the centre of said face. The mirrors $M_{20}$ to $M_{29}$ are arranged at 45° in relation to the axis $F_2X_2$ in order to direct the rays from $F_2$, on to lenses $L_{20}$ to $L_{29}$ having axes perpendicular to $F_2X_2$. At the foci of these lenses, there are located photodetectors $R_{20}$ to $R_{29}$ injecting into amplifier-demodulator circuits $C_{20}$ to $C_{29}$ of a kind well known to the person skilled in the art, and thus furnishing their signals to the channel outputs $U_{20}$ to $U_{29}$.

The operation of the device is as follows. The infrared radiation emitted by diode $E_{11}$ in the spectrum $S_1$, is selectively reflected by the mirror $M_{11}$ which passes the radiation substantially unattenuated, the radiation then passing the ensuing mirrors, for example $M_{18}$ and $M_{19}$, again substantially without attenuation. The same radiation, reconstituted by the fibre at $F_2$, is rendered parallel to the axis $F_2X_2$ by the collimating lens 102, passing thence across the mirror $M_{20}$ to be selectively reflected by the mirror $M_{21}$ and finally focussed by the lens $L_{21}$ of the photodetector $R_{21}$ which supplies the circuit $C_{21}$.

It will be observed that since the mirrors $M_{10}$ to $M_{19}$ on the one hand and those $M_{20}$ to $M_{29}$ on the other, are arranged on the axis $F_1X_1$ and $F_2X_2$ in reverse order, the rays emitted and received at each end in fact pass through them in the same order. Because of this fact, the radiation components produced by each of the channels, have the same number of mirrors to pass and consequently experience the same overall attenuation which is not negligible despite the fact that it is the sum of very small attenuation levels.

By way of example of a practical embodiment, using two one kilometer long fibres each capable (in the absence of the device in accordance with the invention) of transmitting 10 megabits per second with an attenuation of 40 decibels and a communication error rate of $10^{-8}$, it is possible to build, using the terminal electro-optical equipment shown in FIG. 1, a 10-channel system capable of handling 10 times 10, in other words 100 megabits per second. The characteristics of the equipment used in the system, are for example as follows:

a. Diodes $E_{10}$ to $E_{19}$ (aluminium-doped gallium arsenide diodes):
  — threshold current 300 mA;
  — output power at 500mA: 10 mW;
  — beam divergence in the plane of the junction: 15°;
  — beam divergence in the perpendicular plane: 50°;
  — source dimensions: 80 microns by 0.5 microns.

b. Photodetectors (silicon PIN photodiodes):
  — photosensitive area: 1 mm²;
  — total capacitance (for reverse voltage of 20 V): 2pF;
  — dark current: 2 mA;
  — sensitivity at 8500 angstroms units: 0.5 microamps per microwatt.

c. Lenses $L_{10}$ to $L_{29}$:
  — diameter: 1 cm;
  — focal length: 1.5 cm.

d. Selective mirrors:
  — pass bands: 50 angstrom units for the wavelength in question;
  — dimensions: 1.4 cm by 1 cm.

It should be pointed out that since an optical fibre is capable of simultaneous transmission in both directions, in FIG. 1 it is possible to exchange any diode E with the associated photodetector R, provided that the input and output circuits are also exchanged.

Figure 3:
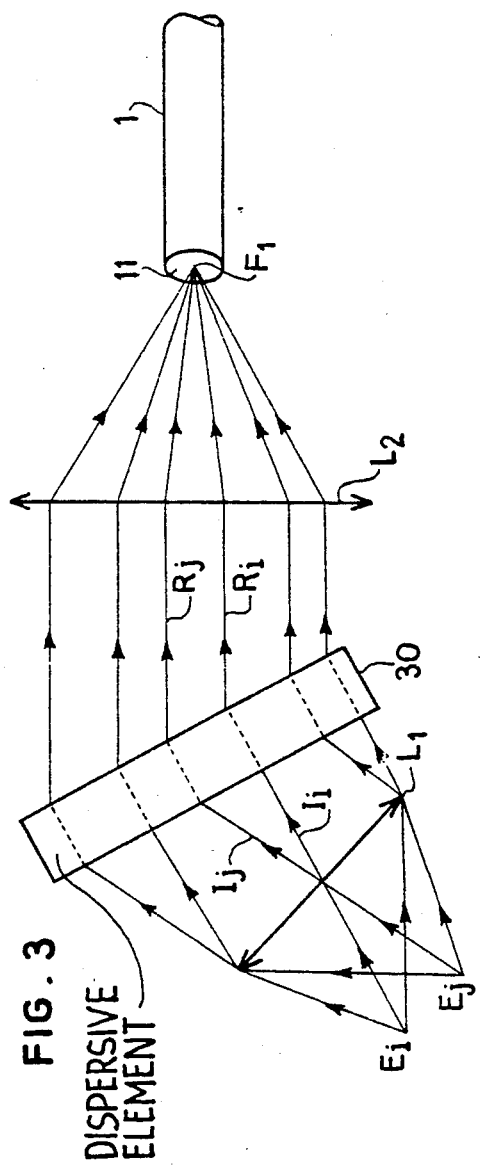
FIGS. 3, 4 and 5 illustrate variant embodiments of the invention.

In a first variant embodiment, the diodes and the photodetectors for the different channels have been respectively arranged in the focal planes on the transmitting and receiving ends. In FIG. 3, the transmitting end of this kind of system has been shown. The receiving end, not shown, is strictly symmetrical. At the transmitting end, the diodes $E_i$ and $E_j$ emitting at the different wavelength $i$ and $j$ are arranged at different points on the straight line representing the intersection of the plane of the figure with the focal plane of a lens $L_1$ whose centre and focus are disposed in the plane of the figure together with the centre $F_1$ of the entry face 11 of the fibre 1.

The different beams emitted by the diodes $E_i$ and $E_j$, give rise to beams made up of rays parallel to the rays $I_i$ and $I_j$ coming from the lens $L_1$. They pass through a dispersive element 30 which is for example a prism of a diffraction grating. The positions of the diodes $E_i$ and $E_j$ and the inclination of the elements 30 are calculated in such a fashion that two incident rays $I_i$ and $I_j$ give rise to two parallel (refracted or diffracted) rays $R_i$ and $R_j$. In the case of the diffraction grating, these will for example be two first order diffracted rays. These rays are focussed by a lens $L_2$ on the face 11.

At the receiving end, the rays $R_i$ and $R_j$ collimated by a lens which is symmetrical with $L_2$, and then dispersed by an element symmetrical with 30, are finally focussed by a lens symmetrical with $L_1$, on the separate photodetectors.

Figure 4:
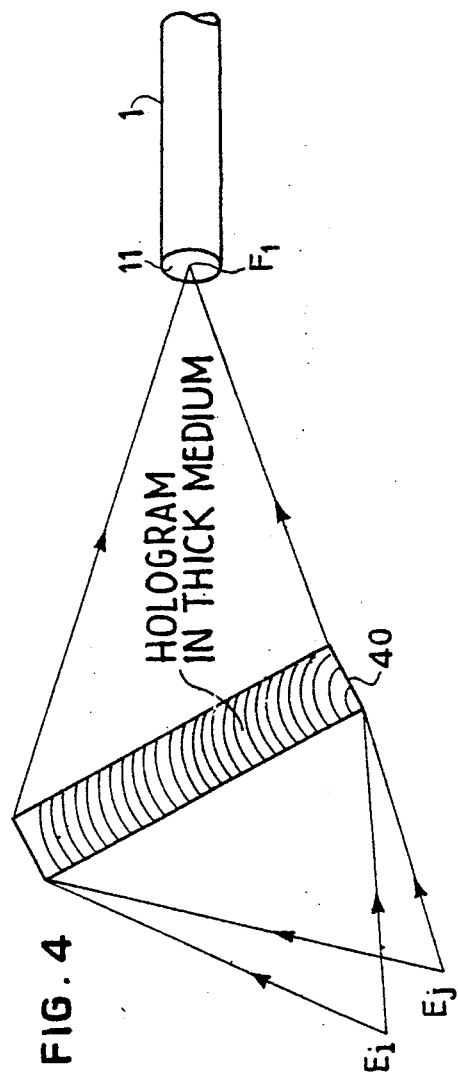

In a second variant embodiment, the assembly of three optical elements $L_1$, 30 and $L_2$ FIG. 3, is replaced in FIG. 4 by a single holographic lens 40 which is a hologram in a thick medium. Considering the point $F_1$ which is the centre of the entry face 11 of the fibre 1, the rays emerging from the hologram 40 seem to stem from a single source. At the receiving end, the rays emerging from a symmetrical hologram, are focussed at different points depending upon the wavelength and it is at these points that the photodetectors pertaining to the different channels are arranged.

Figure 5:
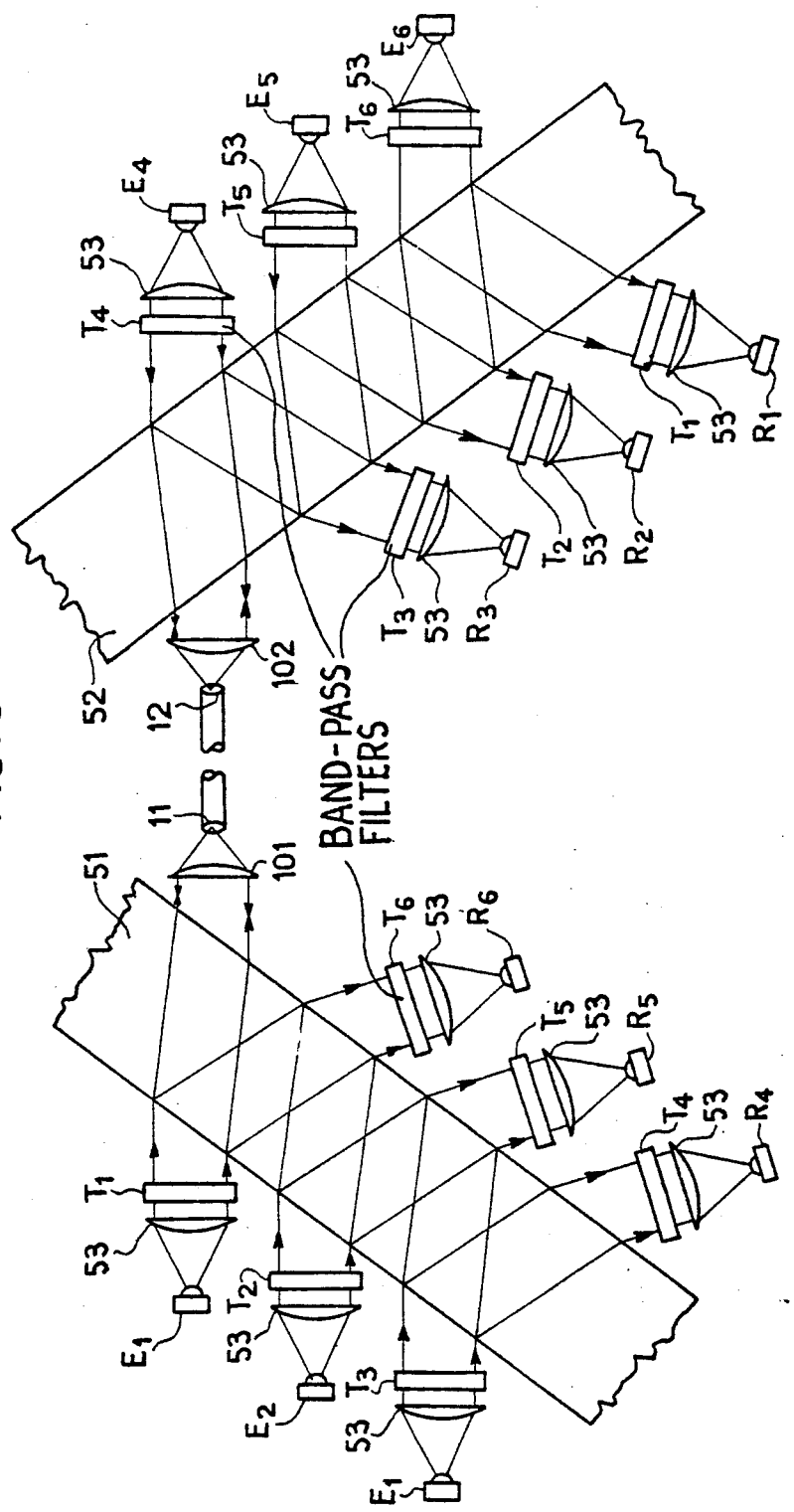

In a third variant embodiment, a single fibre can be used for both directions of transmission, thanks to the provision of the terminal equipment shown in FIG. 5 pertaining to an example involving six channels, three in either direction. At the end corresponding to the face 11, a glass plate 51 is arranged, having parallel faces, at either side of which there are disposed three diodes $E_1$, $E_2$, $E_3$ and three photodetectors $R_4$, $R_5$, $R_6$. At the end corresponding to the face 12, in a symmetrical arrangement there are encountered a plate 52, three diodes $E_4$, $E_5$, $E_6$ and three photodetectors $R_1$, $R_2$, $R_3$. In front of each diode and each photodetector there is a lens 53 having a focal point on the corresponding emissive or photodetecting face. Band-pass filters $T_1$ to $T_6$ centred in pairs on six different wavelengths (as in the case with the spectrum shown in FIG. 2 for example) are arranged respectively in front of the corresponding lenses 53.

The path of the light rays is as follows. First of all let us consider the trajectories of the light rays issuing from the diode $E_1$. They experience two refractions at the end corresponding with the face 11 and, at the end corresponding with the face 12 successively a refraction, five reflections and another refraction, before terminating at the detector $R_1$, thus in total four refractions and five reflections. It will readily be appreciated that in the arrangement shown in FIG. 5, for the other trajectories $E_2$, $R_2$, $E_3$, $R_3$ etc . . . , the same number of refractions and reflections is experienced albeit in a different order.

The result of this is that the six channels, vis-a-vis the transmitted radiation, will present the same total attenuation. If we assume that the faces of the glass plates 51 and 52 act as semi-reflective walls, then a total attenuation of the order of 25–30 decibels will be experienced in the case where there are three channels in either direction. In this variant embodiment, the system would seem to be limited to the operation of a small number of channels. It is possible to combine the equipment provided in the third variant embodiment, for a small number of channels, with the equipment provided for the embodiment shown in FIG. 1, which handles a larger number of channels. In this way, the communication facilities offered by the fibres, are only partially utilised in both directions.

If reliability of communication takes precedence over other considerations, then a bunch of several fibres will be used, the entry and exit faces of which are arranged side by side in the same plane. It is worth while combining this arrangement with the multiplexing system which forms the object of the present invention, in order to provide several channels or, more simply, a go channel and a return channel. Thus, in this latter case, we arrive at the device shown by way of example in FIG. 6. A diode $E_1$, radiating within a narrow frequency band, is arranged at the focus of a lens $L_1$. The rays leaving this lens form cylindrical beam passing a mirror $M_1$ of selective type arranged at 45° in relation to the beam and producing no substantial attenuation vis-a-vis the emission spectrum of $E_1$. A lens $L_2$, parallel to $L_1$ then concentrates the rays coming from $E_1$ and $L_1$ on the entry face 601 of a bunch of fibres 600. At the opposite end of the bunch, there are the lenses $L_4$ and $L_5$ between which there is disposed, at 45°, a selective mirror $M_2$ identical to that $M_1$. The lens $L_5$ concentrates the rays coming from the exit face 602, on the photosensitive electrode of a photodetector, $R_1$.

Because of the provision of the selective mirrors $M_1$ and $M_2$, the rays emitted by a diode $E_2$ arranged at the focus of a lens $L_6$ (disposed at 90° to the parallel lenses $L_4$ and $L_5$) are reflected by the mirror $M_2$ which has a normal reflective power in the emission spectrum of $E_2$. After passing the lens $L_4$, they converge on the face 602 which, vis-a-vis this spectrum, acts as entry face. In the same manner, the face 601 plays the part of exit face vis-a-vis the radiation from $E_2$, which is concentrated on the photosensitive electrode of a photodetector $R_2$ by the lens $L_2$, the mirror $M_1$ and the lens $L_3$ arranged at 90° to the parallel lenses $L_1$ and $L_2$.

Figure 6:
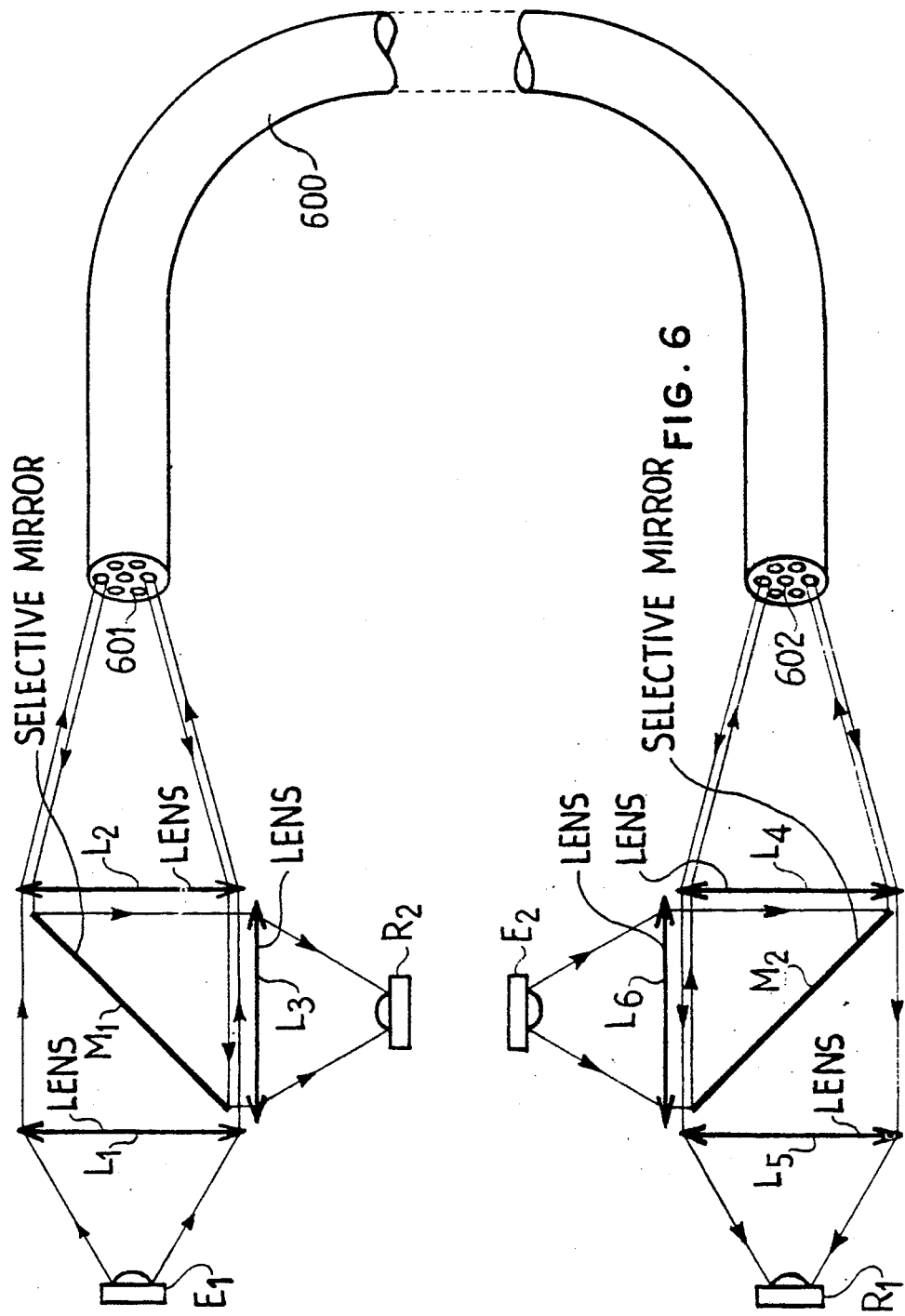
FIG. 6 illustrates a device for operating the system in accordance with the invention.

Self-evidently, in the case of the device shown in FIG. 6, the emission spectra of the diodes $E_1$ and $E_2$ are chosen to have a much larger interval from one another than in the case of FIG. 2. For example, the interval will be of the order of 1400 angstrom units instead of 100 angstrom units as was the case in FIG. 2. The design of the selective mirror is facilitated by the magnitude of this interval ant the cost is also reduced. It should be pointed out that the device operates equally well with simple semi-transparent mirrors although the transmission efficiency is poorer.

The device shown in FIG. 6 is applicable in particular to the transmission of remote-control signals, for example in airborne equipment.

What we claim is:

1. A system for transmitting independent communication channels through a light-wave medium, said system comprising, staggered on at least one transmission direction:

a plurality of $n$ diodes, $n$ being an integer at least equal to 2, said diodes producing light radiations of different wavelengths;
a plurality of $n$ channel inputs;
a plurality of $n$ amplifiers, supplied by said channel inputs;
a plurality of $n$ lenses collimating light emitted by said diodes on one axis via a plurality of $n$ parallel mirrors, $n - 1$ of which are selective;
one lens focussing said collimated light on the entry of said light-wave medium;
a plurality of photodetectors;
a lens collimating the light transmitted by said medium in one axis;
a plurality of $n$ parallel mirrors, $n - 1$ of which are selective;
a plurality of $n$ lenses focussing the light reflected by said mirrors on said plurality of photodetectors;
a plurality of $n$ amplifier detectors supplied by said photodetectors;
a plurality of $n$ channel outputs supplied by said amplifier detectors.

2. A system as claimed in claim 1, wherein said light-wave medium is a single light-wave fiber.

3. A system as claimed in claim 1, wherein the light-wave medium is a bunch of light-wave fibers, the input and output faces of which are laid out respectively in small portions of planes at each end of the transmitting path.

4. A system as claimed in claim 1, wherein at a transmitting end, said diodes are laid out in a line parallel to said collimation axis, said lenses have their optical axes parallel to one another and perpendicular to said collimation axis, said mirrors are plane mirrors inclined at 45° in relations to said axis, the nonselective mirror being the most distant from the entry of said light-wave medium, and at the receiving end the arrangement is analog to the arrangement at the transmitting end, the exit face being substituted to the entry face.

5. A system as claimed in claim 1, wherein said diodes are constituted by gallium arsenide diodes.

6. A system as claimed in claim 1, wherein said photodetectors are constituted by silicon diodes.

7. A system as claimed in claim 3, wherein said bunch of optical fibres have their ends disposed side by side respectively in one plane at each end of said bunch, a selective mirror separating the light rays transmitted in the two directions by two diodes each possessing its own emission spectral line.

8. A system as claimed in claim 7, comprising furthermore, at each end of said bunch, a first and a second parallel lenses, between which said selective mirror is arranged at 45° in relation to said first and second lenses, and a third lens disposed at 90° in relation to said lenses.

9. A system for transmitting independent communication channels through a light-wave medium, said system comprising at each end of the transmitting path constituted by said medium, an arrangement of $n$ diodes and $n$ photodetectors, $n$ being an integer at least equal to 2, said diodes producing light radiations of different wavelengths a row of diodes and a row of photodetectors being laid out at either side of an optical plate having parallel faces, a lens and a bandpass filter being arranged between each diode and said optical plate on the one hand, and between each photoconductor and said plate, on the other hand.

* * * * *